(12) United States Patent
Shen (10) Patent No.: US 8,867,651 B2
(45) Date of Patent: Oct. 21, 2014

(54) SYSTEMS AND METHODS FOR PROVIDING SIGNALS OF MULTIPLE ACTIVE WIRELESS TRANSMITTERS

(75) Inventor: Ying Shen, Chapel Hill, NC (US)

(73) Assignee: Aviat U.S., Inc., Santa Clara, CA (US)

( * ) Notice: Subject to any disclaimer, the term of this patent is extended or adjusted under 35 U.S.C. 154(b) by 0 days.

(21) Appl. No.: 13/249,202

(22) Filed: Sep. 29, 2011

(65) Prior Publication Data
US 2012/0082264 A1 Apr. 5, 2012

Related U.S. Application Data

(60) Provisional application No. 61/388,421, filed on Sep. 30, 2010.

(51) Int. Cl.
H04B 1/02 (2006.01)
H04L 27/36 (2006.01)

(52) U.S. Cl.
CPC ............................. H04L 27/368 (2013.01)
USPC .......... 375/295; 375/300; 455/39; 455/67.16; 455/91; 455/101; 455/102; 455/103; 455/108; 455/502

(58) Field of Classification Search
USPC .................. 375/295–300; 455/67.11, 73, 455/114.1–114.3, 561–562
See application file for complete search history.

(56) References Cited

U.S. PATENT DOCUMENTS

| 8,526,895 | B2 * | 9/2013 | Shen et al. ................ 455/101 |
|---|---|---|---|
| 2003/0022694 | A1 * | 1/2003 | Olsen et al. ................ 455/562 |
| 2004/0204100 | A1 * | 10/2004 | Braithwaite ................. 455/561 |
| 2006/0291583 | A1 * | 12/2006 | Hammerschmidt et al. .. 375/295 |
| 2008/0218400 | A1 * | 9/2008 | Stolarczyk et al. ............ 342/22 |
| 2009/0191825 | A1 * | 7/2009 | Georgantas et al. .......... 455/102 |
| 2009/0257751 | A1 * | 10/2009 | Sadananda et al. ............ 398/83 |
| 2012/0082072 | A1 * | 4/2012 | Shen ............................ 370/297 |
| 2012/0082264 | A1 * | 4/2012 | Shen ............................ 375/299 |
| 2012/0106667 | A1 * | 5/2012 | Shen et al. .................... 375/267 |
| 2012/0108188 | A1 * | 5/2012 | Matsumoto et al. .......... 455/118 |

OTHER PUBLICATIONS

International Application No. PCT/US2011/054073, International Search Report and Written Opinion mailed Jan. 23, 2012.

* cited by examiner

Primary Examiner — Daniel Washburn
Assistant Examiner — Eboni Hughes
(74) Attorney, Agent, or Firm — Sheppard, Mullin, Richter & Hampton LLP (57) ABSTRACT

Systems and methods for combining signals from multiple active wireless transmitters are discussed herein. An exemplary system comprises a radio enclosure, a first transmitting RFU, a second transmitting RFU, and a combiner. The first transmitting RFU may be configured to receive a signal, upconvert the signal, compare a phase of the upconverted signal to a predetermined phase value, and adjust the phase of the signal based on the comparison to provide a first phase-adjusted upconverted signal. The second transmitting RFU may be configured to receive the signal, upconvert the signal, compare a phase of the upconverted signal to the predetermined phase value, and adjust the phase of the signal based on the comparison to provide a second phase-adjusted upconverted signal. The coupler may be configured to combine the first and second phase-adjusted upconverted signals to create an output signal and provide the output signal to an antenna for transmission.

21 Claims, 10 Drawing Sheets

SYSTEMS AND METHODS FOR PROVIDING SIGNALS OF MULTIPLE ACTIVE WIRELESS TRANSMITTERS

CROSS-REFERENCE TO RELATED APPLICATIONS

The present application claims benefit of U.S. Provisional Patent Application No. 61/388,421 filed Sep. 30, 2010, and entitled "Phase and Amplitude Controlled Transmitter and its Hitless Protection Applications" which is incorporated by reference herein.

BACKGROUND

1. Field of the Invention(s)

The present invention(s) generally relate to wireless transmitters. More particularly, the invention(s) relate to systems and methods for providing signals from multiple active wireless transmitters.

2. Description of Related Art

In microwave radio systems, transmitter backup systems are common. In a typical transmitter backup system, there is one main active transmitter and one or more other secondary "backup" transmitters. The secondary backup transmitters are muted and inactive while the main active transmitter transmits signals to a wireless receiver (e.g., a tower or other wireless signal receiving device). If the main active transmitter fails or is operating below an acceptable limit, the main active transmitter may be muted and one of the secondary backup transmitters becomes the main active transmitter. In the prior art, there is only one active transmitter at any one time.

Figure 1:
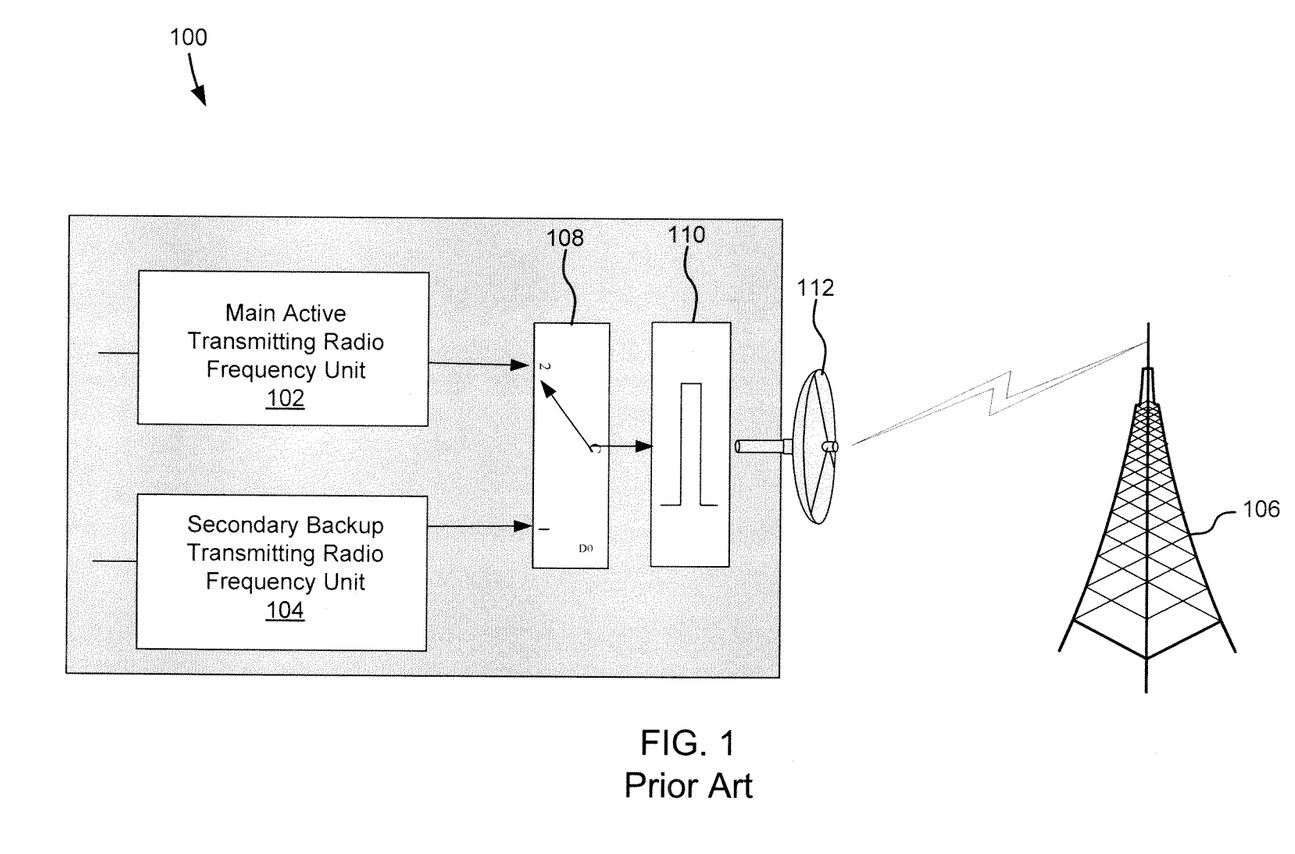
FIG. 1 depicts a main active transmitting radio frequency unit (RFU) and a secondary backup transmitting RFU in the prior art

FIG. 1 depicts a main active transmitting radio frequency unit (RFU) 102 and a secondary backup transmitting RFU 104 in the prior art. FIG. 1 implements a monitor hot standby (MHSB) approach. The MHSB configuration is often used when radio housing is designed to equip at least for two and more RFUs. In normal operation, both RFUs are in full power status and the two radios are connected to a high power switch 108 (e.g., an Antenna Coupling Unit (ACU)) or a Diplexer. One radio on the protected side (e.g., secondary backup transmitting RFU 104) is in the off position of the switch 108. The switch 108 may be either a reflective or an absorb switch. Power on both sides is monitored. When there is a failure, an alarm activates and the transmit path will switch from one side to the other. The failed RFU will then be replaced.

In one example, a main active transmitting RFU 102 in an environment 100 provides a wireless signal to a wireless communication tower 106 (e.g., cell tower or other microwave radio device) via an antenna 112. If the main active transmitting RFU 102 fails or falls below an acceptable level of performance, the switch 108 switches to the secondary backup transmitting RFU 102.

A failure detector device monitors one or both transmitting RFUs 102 and 104 for failure. When a failure is detected, a command may be sent to the switch 108 to switch to the other transmitting RFU. The signal is then provided to the antenna 112 via the diplexer 110. Unfortunately, switching from one transmitting RFU to the other causes a loss of performance and an interruption of service and, therefore, the system is not "hitless."

Figure 2:
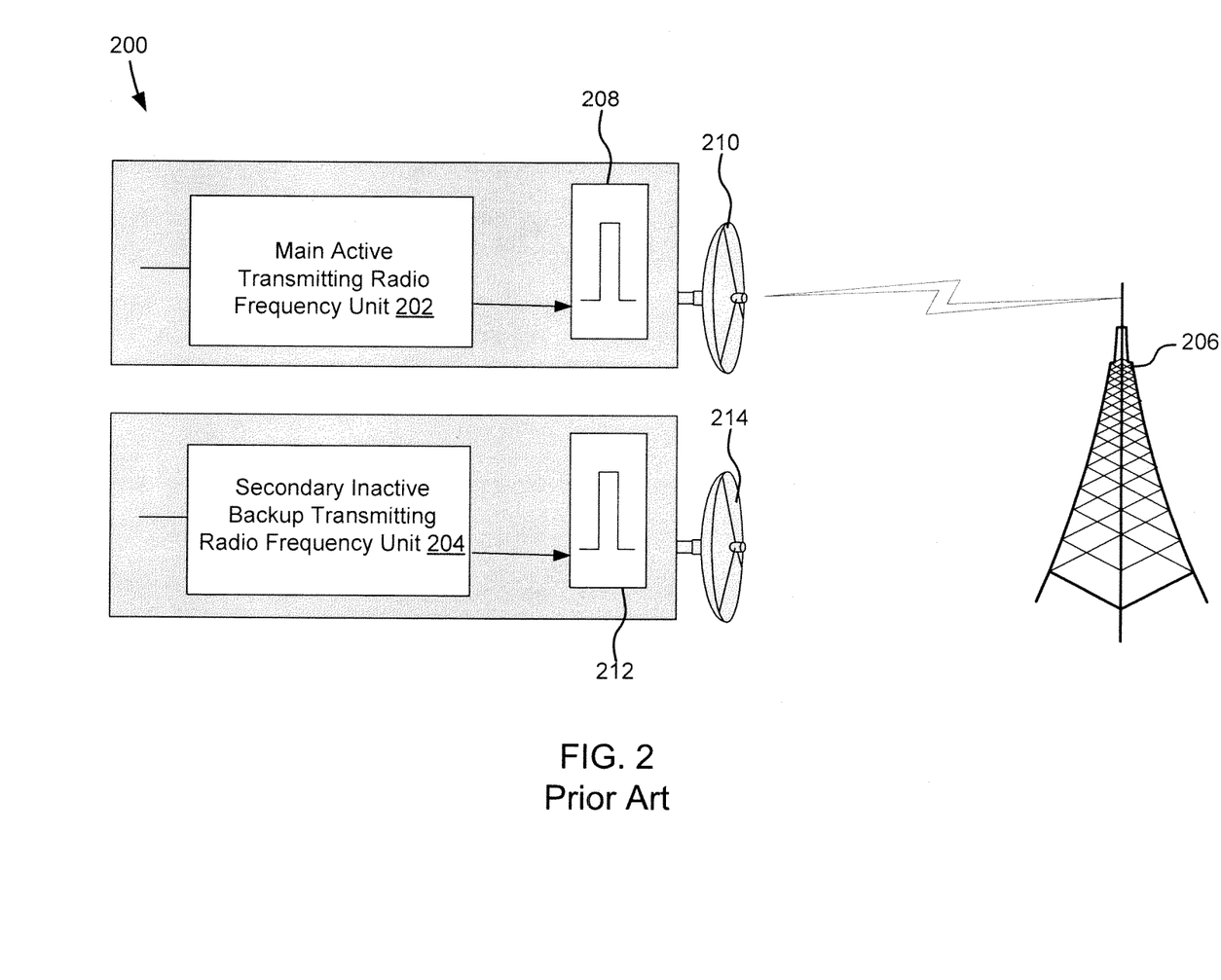
FIG. 2 depicts a main active transmitting RFU and a secondary inactive backup transmitting RFU when an RFU enclosure is optimized for protection in the prior art.
Figure 3:
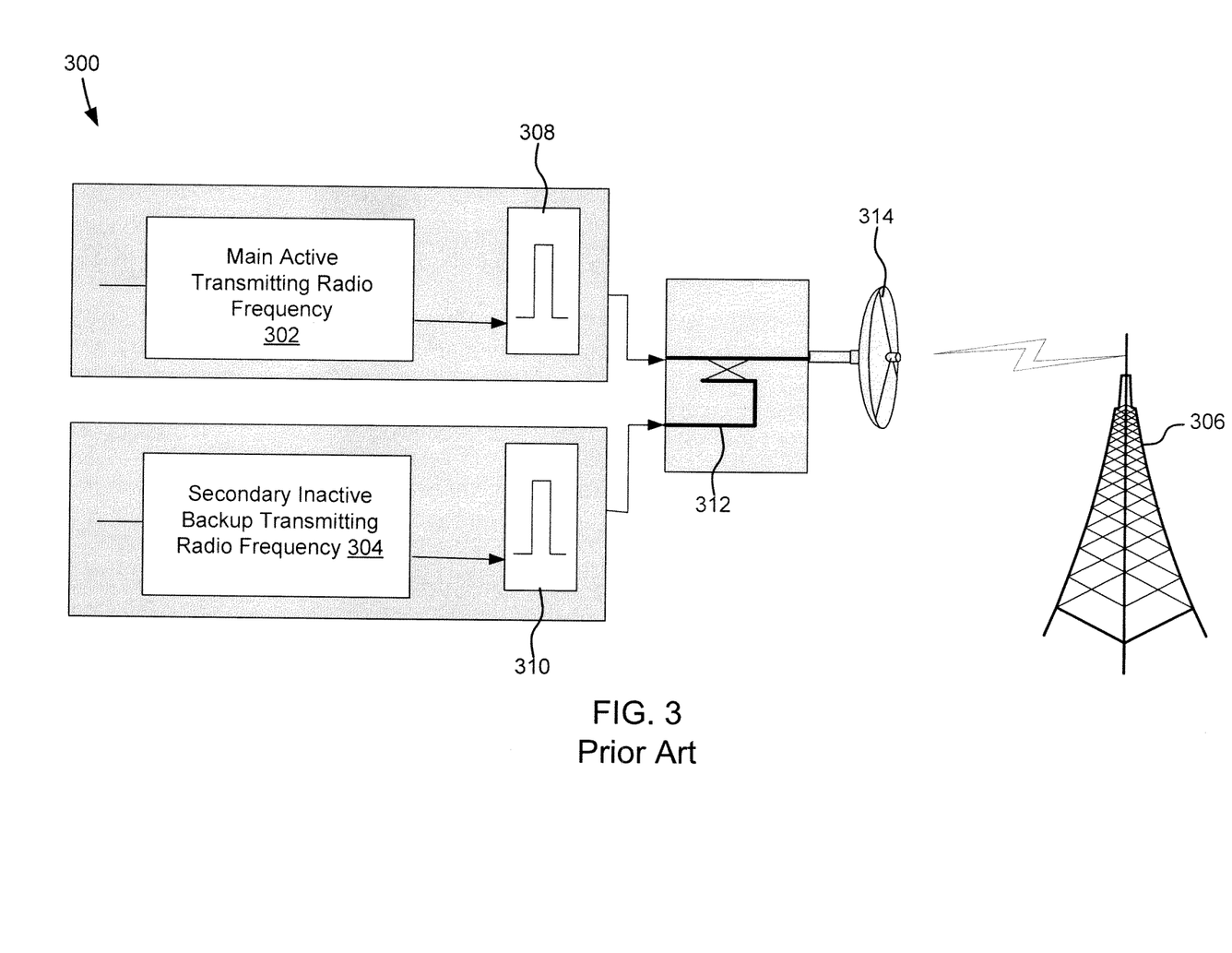
FIG. 3 depicts a main active transmitting RFU and a secondary inactive backup transmitting RFU with a single antenna in the prior art.

FIGS. 2 and 3 depict a mute protected approach or cold standby (CSB). FIGS. 2 and 3 are often used when the RFU is optimized for a non-protected RFU. In one example, the protected radio (e.g., secondary inactive backup transmitting RFU 204) is muted. When there is a failure, the operator will first mute the problem transmitter, un-mute the protected RFU, then replace the failed RFU.

FIG. 2 depicts a main active transmitting RFU 202 and a secondary inactive backup transmitting RFU 204 with separate antennas 210 and 214 in the prior art. In an environment 200, a main active transmitting radio frequency unit 202 transmits data through the antenna 210 via the diplexer 208 to the wireless communication receiver 206. The secondary inactive backup transmitting RFU 204 may be muted or otherwise inactive. It is not uncommon that the secondary inactive backup transmitting RFU 204 is powered and ready to be made active thereby acting as a backup to the main active transmitting radio frequency unit 202.

If the main active transmitting RFU 202 fails or falls below an acceptable level of performance, the main active transmitting radio frequency unit 202 may be muted or become inactive and the secondary inactive backup transmitting RFU 204 may become active. As a result the formerly secondary inactive backup transmitting RFU 204 will become the primary transmitting unit and provide the signal to the antenna 214 via the diplexer 212 for transmission to the wireless communication receiver 206.

FIG. 3 depicts a main active transmitting RFU 302 and a secondary inactive backup transmitting RFU 304 with a single antenna in the prior art. Although an external coupler is depicted, the protected side is required to be muted because of potential interference and cancellation of two signals as a result of random phase characteristics.

In the environment 300, the main active transmitting RFU 302 and the secondary inactive backup transmitting RFU 304 are coupled via coupler 312 with the antenna 314. As similarly discussed with regard to FIG. 2, the main active transmitting RFU 302 transmits data through the antenna 314 via the diplexer 308 to the wireless communication receiver 306. The secondary inactive backup transmitting RFU 304 may be muted or otherwise inactive.

If the main active transmitting RFU 302 fails or falls below an acceptable level of performance, the main active transmitting RFU 302 may be muted or become inactive and the secondary inactive backup transmitting RFU 304 may become active. As a result, the formerly secondary inactive backup transmitting RFU 304 will become the primary transmitting unit and provide the signal to the antenna 314 via the diplexer 310 and the coupler 312 for transmission to the wireless communication receiver 306. The coupler 312 may provide faster communication over the antenna 314 than the switching element discussed with regard to FIG. 1. Unfortunately, activating one RFU and deactivating the other (e.g., based on unsatisfactory performance), causes a loss of performance and an interruption of service and, therefore, the system is not "hitless."

SUMMARY OF THE INVENTION

Systems and methods for combining signals from multiple active wireless transmitters are discussed herein. An exemplary system comprises a radio enclosure, a first transmitting RFU, a second transmitting RFU, and a combiner. The first transmitting RFU may be configured to receive a signal, upconvert the signal, compare a phase of the upconverted signal to a predetermined phase value, and adjust the phase of the signal based on the comparison to provide a first phase-adjusted upconverted signal. The second transmitting RFU may be configured to receive the signal, upconvert the signal, compare a phase of the upconverted signal to the predetermined phase value, and adjust the phase of the signal based on the comparison to provide a second phase-adjusted upconverted signal. The coupler may be configured to combine the first and second phase-adjusted upconverted signals to create an output signal and provide the output signal to an antenna for transmission.

The phase of the first phase-adjusted upconverted signal may be substantially similar to the phase of the second phase-adjusted upconverted signal. In some embodiments, the first transmitting radio frequency unit is further configured to compare a gain of the upconverted signal to be transmitted to a predetermined gain value and adjust the gain of the signal to be transmitted. Further, the second transmitting radio frequency unit may also be further configured to compare a gain of the upconverted signal to be transmitted to the predetermined gain value and adjust the gain of the signal to be transmitted. The gain of the first phase-adjusted upconverted signal may be substantially similar to the gain of the second phase-adjusted upconverted signal.

In various embodiments, if the first transmitting radio frequency unit fails, the second transmitting radio frequency unit performs hitless protection by providing the second phase-adjusted signal to the antenna for transmission. The first transmitting radio frequency unit may further comprises a modem configured to provide the signal to be transmitted based on an in-phase component of a baseband signal and a quadrature component of the baseband signal. The first transmitting radio frequency unit configured to adjust the phase of the signal to be transmitted may comprise the first transmitting radio frequency unit configured to adjust a phase of the in-phase component and adjust a phase of the quadrature component.

In various embodiments, the first and second transmitting radio frequency units are coherent. In some embodiments, the coupler may provide the output signal to the antenna via a waveguide filter and a waveguide for point-to-point microwave transmission.

An exemplary method comprises receiving, by a first transmitting radio frequency unit within a radio enclosure, a signal to be transmitted, upconverting, by the first transmitting radio frequency unit, the signal to be transmitted, comparing, by the first transmitting radio frequency unit, a phase of the upconverted signal to be transmitted to a predetermined phase value, adjusting, by the first transmitting radio frequency unit, the phase of the signal to be transmitted based on the comparison to provide a first phase-adjusted upconverted signal, receiving, by a second transmitting radio frequency unit within the radio enclosure, the signal to be transmitted, upconverting, by the second transmitting radio frequency unit, the signal to be transmitted, comparing, by the second transmitting radio frequency unit, a phase of the upconverted signal to be transmitted to the predetermined phase value, adjusting, by the second transmitting radio frequency unit, the phase of the signal to be transmitted based on the comparison to provide a second phase-adjusted upconverted signal, combining the first and second phase-adjusted upconverted signal to create an output signal, and providing the output signal to an antenna for transmission.

Another exemplary method comprises providing a radio enclosure, installing, within the radio enclosure, a first transmitting radio frequency unit, the first transmitting radio frequency unit configured to receive a signal to be transmitted, upconvert the signal to be transmitted, compare a phase of the upconverted signal to be transmitted to a predetermined phase value, and adjust the phase of the signal to be transmitted based on the comparison to provide a first phase-adjusted upconverted signal, installing, within the radio enclosure, a second transmitting radio frequency unit, the second transmitting radio frequency unit configured to receive the signal to be transmitted, upconvert the signal to be transmitted, compare a phase of the upconverted signal to be transmitted to the predetermined phase value, and adjust the phase of the signal to be transmitted based on the comparison to provide a second phase-adjusted upconverted signal, providing a coupler configured to combine the first and second phase-adjusted upconverted signals to create an output signal, filtering the output signal with a waveguide filter; and providing the filtered output signal to an antenna for transmission.

DETAILED DESCRIPTION OF THE INVENTION

In various embodiments, signals from multiple transmitters of microwave wireless systems may be adjusted to share substantially identical (i.e., similar, identical or same) phase and/or gain. The signals may be combined to strengthen the signal and then transmitted by a shared antenna. As a result, instead of allowing one transmitter to remain inactive (i.e., purely in a mute and/or standby mode until needed), two or more active transmitters may provide backup to each other while strengthening the signal to be transmitted. In at least some of the embodiments discussed herein, hitless protection may be achieved. For example, if one of the transmitters fails, the other transmitter may continue to act as an active transmitter without a lapse in performance or service. As a result, time is not lost switching between a failed transmitter to a standby transmitter.

Figure 4:
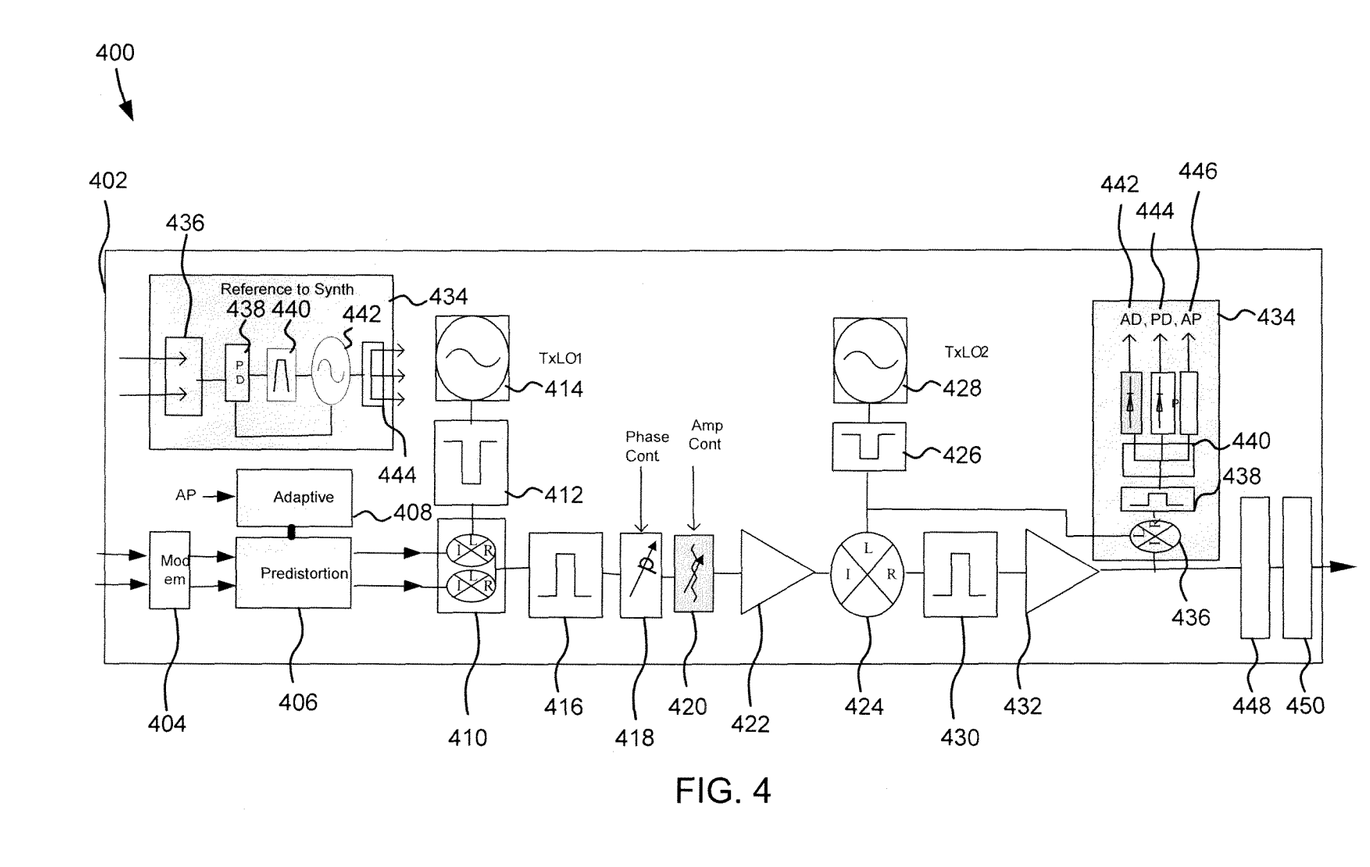
FIG. 4 is a block diagram of an exemplary transmitting radio frequency unit in some embodiments.

FIG. 4 is a block diagram 400 of an exemplary transmitting radio frequency unit 402 in some embodiments. In various embodiments, the transmitting radio frequency unit 402 is configured to provide a signal from the modem 404 and adjust the phase of the signal to be transmitted. The phase of the signal to be transmitted may be adjusted based on a comparison of the phase of the signal to a predetermined phase value. In some embodiments, the transmitting radio frequency unit 402 may also be configured to adjust the gain of the signal to be transmitted. In one example, the transmitting radio frequency unit 402 may adjust the gain of the signal to be transmitted based on a comparison of a gain of the signal to be transmitted to a predetermined gain value.

The transmitting radio frequency unit 402 may be any transmitter including, but not limited to, a heterodyne transmitter with a TX intermediate frequency (IF) output. Those skilled in the art will appreciate that multiple transmitting radio frequency units may be used to transmit the same signal (e.g., signals containing the same information provided by a wireless communication source). Each transmitting radio frequency unit may adjust the phase of the signal to be transmitted, respectively, based on the same predetermined phase value. Similarly, each transmitting radio frequency unit may adjust the gain of the signal to be transmitted, respectively, based on the same gain value. As a result, the phase and gain of the signal from each transmitting radio frequency unit may be the same or substantially similar (e.g., the phase and gain of the signals may be identical). The signals may be subsequently combined to strengthen the signal. In one example, the signals are combined prior to transmission over the antenna. In another example, the signals are transmitted over different antennas and the signals spatially combine.

The transmitting radio frequency unit 402 may comprise a modem 404, a predistortion module 406, an adaptive module 408, amplification/attenuation modules 422 and 424, filter modules 412, 416, 426, 430, and 438, mixer modules 410, 424, and 436, oscillator modules 414 and 428, a signal quality control module 434, an automatic gain control (AGC) module 420, and a phase adjuster 418.

The modem 404 may be any modem configured to receive one or more signals to be transmitted. The modem 404, in one example, may receive an inphase (I) and quadrature (Q) signals and provide the signals to the predistortion module 406.

The predistortion module 406 may receive the signal from the modem 404 and improve the linearity of the signal. In various embodiments, the predistortion module 406 inversely models gain and phase characteristics and produces a signal that is more linear and reduces distortion. In one example, "inverse distortion" is introduced to cancel non-linearity. The predistortion module 406 may receive a predistortion control signal from the adaptive module 408. The adaptive module 408 may provide the control signal based on the sample from the signal quality control module 434 described herein. The predistortion module 406 may provide the I and Q signals to the mixer module 410.

The mixer module 410, filter module 412, and the oscillator module 414 may represent an upconverter configured to upconvert the signals to an intermediate frequency signal. Similarly, the mixer module 424, filter module 426, and oscillator module 428 also may represent an upconverter configured to further upconvert the signal to a final RF signal. Those skilled in the art will appreciate that there may be any number of upconverters configured to upconvert the signals within the transmitting radio frequency unit 402.

The mixer modules 410, 424, and 436 may comprise mixers configured to mix the signal(s) provided by the modem with one or more other signals. The mixer modules 410, 424, and 436 may comprise many different types of mixers with many different electrical properties. In one example, the mixer 410 mixes I and Q signals received from the filter module predistortion module 406 with the filtered oscillating signal from the filter module 412 and the oscillator module 414. In another example, the mixer module 424 mixes a signal received from the amplifier/attenuator module 422 with the filtered oscillating signal from the filter module 426 and the oscillator module 438. In some embodiments, the amplifier/attenuator module 436 mixes the RF signal from the amplifier/attenuator module 432 with the filtered oscillator signal from the oscillator module 428 and the filter module 426.

Those skilled in the art will appreciate that each of the mixers 410, 424, and 436 may be the same as one or more other mixer modules. For example, mixer modules 410 and 424 may both be mixers sharing the same electrical properties or, alternately, the mixer modules 410 and 424 may be another kind of mixer and/or with different electrical properties.

Each mixer modules 410, 424, and 436 may include one or more components. For example, the mixer module 410 may comprise one or more mixers.

The filter modules 412, 416, 426, 430, and 438 may comprise filters configured to filter the signal. The filter modules 412, 416, 426, 430, and 438 may comprise many different types of filters (e.g., bandpass filter, low pass filter, high pass filter, or the like) with many different electrical properties. In one example, the filter module 412 may be a band pass filter configured to filter the signal (or components of the signal) provided from the predistortion module filter module 416. Similarly, filter modules 416, 426, 430, and 438 may filter signals (or components of the signals) from the oscillator module 414, the oscillator module 428, the mixer module 410, or the mixer module 436, respectively.

Those skilled in the art will appreciate that each of the filter modules 412, 416, 426, 430, and 438 may be the same as one or more other filter modules. For example, filters module 412 and 416 may both be filters sharing the same electrical properties while filter module 426 may be another kind of filter. In another example, filters module 412 and 416 may both be filters of a similar type but have different electrical properties.

Each filter modules 412, 416, 426, 430, and 438 may include one or more components. For example, the filter modules 412 may comprise one or more filters.

The oscillator modules 414 and 428 may comprise oscillators configured to provide an oscillating signal that may be used to upconvert the signal. The oscillator modules 414 and 428 may comprise any kind of oscillator with any different electrical properties. In one example, the oscillator module 414 provides an oscillating signal to the filter module 412. The oscillator module 428 may provide an oscillating signal to the filter module 426.

The oscillating modules 414 and 428, either individually or together, may be local or remote. In one example, the oscillating module 414 and/or the oscillating module 428 may be remotely located and configured to provide an oscillating signal to one or more transmitting radio frequency units. In some embodiments, a single oscillating module may provide an oscillating signal to both the mixer module 410 and 424, respectively (e.g., optionally via a filter). In one example, the oscillator signal from the oscillator module may be altered (e.g., oscillation increased or decreased) and provided to a different part of the circuit.

Those skilled in the art will appreciate that each of the oscillator modules 414 and 428 may be the same as each other. For example, oscillator modules 414 and 428 may both be oscillators sharing the same electrical properties or, alternately, the oscillator modules 414 and 428 may be another kind of oscillator and/or with different electrical properties.

Each oscillator modules 414 and 428 may include one or more components. For example, the oscillator module 414 may comprise one or more oscillators.

The signal quality control module 434 may be configured to generate a phase control signal to control the phase of a processed signal. In one example, the signal quality control module 434 receives the upconverted RF signal from the amplifier/attenuator module 432 and mixes the amplified or attenuated signal with the filtered local oscillator or the upconverted signal from the second upconverter (e.g., mixer module 424, filter module 426, and oscillator module 428). The signal quality control module 434 may filter (e.g., using the filter module 338) and compare the filtered, mixed signal with a predetermined phase value to generate a phase control signal based on the comparison.

In some embodiments, a splitter 440 may be used to split the signal between the adaptive module control signal 442, the phase comparator 444, and the gain comparator 446. The phase comparator may generate the phase control signal based on a comparison of the phase of the signal from the mixer module 436 with a predetermined phase value. The phase control signal may be provided to the phase adjuster 418. The gain comparator may generate the gain control signal based on a comparison of the gain of the signal from the mixer module 436 with a predetermined phase value. The gain control signal may be provided to the AGC 420. In some embodiments, the splitter 440 may be added to a preexisting transmitting radio frequency unit 402 in order to add the phase and gain control elements thereby reducing costs.

The signal quality control module 434 may comprise a variety of different components (e.g., a mixer, filter, splitter, and a comparison module). The signal quality control module 434 is further described with regard to FIGS. 8-10 herein. In various embodiments, one signal quality control module 434 may receive signals from a plurality of different transmitting radio frequency units and provide phase control signals and/or gain control signals to one or more of the different transmitting radio frequency units.

The phase adjuster 418 may comprise a variable phase control circuit configured to increase or decrease the phase of the signal to be transmitted. The phase adjuster 418 may comprise any different type of phase adjuster or phase shifter with different electrical properties. In one example, the phase adjuster 418 increases or decreases the phase of the signal received from the filter module 416. The phase adjuster 418 may adjust the phase of the signal based on the phase control signal from the signal quality control module 434.

The phase adjuster 418 may include one or more components. For example, the phase adjuster 418 may comprise one or more phase control elements.

The AGC module 420 may comprise an automatic gain control (AGC) circuit configured to increase or decrease the gain of the signal received from the phase adjuster 418. The AGC module 420 may comprise many different types of AGCs with many different electrical properties. In one example, the AGC module 420 increases or decreases the gain of the signal received from the phase adjuster 418. The AGC module 420 may adjust the gain of the signal based on the gain control signal.

The AGC module 420 may include one or more components. For example, the AGC module 420 may comprise one or more AGCs.

The amplification/attenuation modules 422 and 432 may comprise an amplifier and/or an attenuator configured to amplify and/or attenuate a signal. The amplification/attenuator modules 422 and 432 may be any kind of amplifiers and/or attenuators. Further, the amplification/attenuator modules 422 and 432 may each comprise amplifiers and/or attenuators with any kind of electrical properties.

In some embodiments, the amplifier/attenuator module 422 receives a signal from the AGC module 420. The amplifier/attenuator module 422 may amplify or attenuate the signal. Further, the amplifier/attenuator module 432 may attenuate the signal (or components of the signal) after the signal has been upconverted by the mixer module 424, the filter module 426, and the oscillator module 428. The amplifier/attenuator module 432 may then provide the signal to the signal quality control module 434 and/or the waveguide filter 448.

Those skilled in the art will appreciate that each of the amplifier/attenuator modules 422 and 432 may be the same as one or more other amplifier/attenuator modules. For example, amplifier/attenuator modules 422 and 432 may both be amplifiers sharing the same electrical properties. In another example, amplifier/attenuator modules 422 and 432 may both be amplifiers but have different electrical properties.

Each amplifier/attenuator module 422 and 432 may include one or more components. For example, the amplifier/attenuator module 422 may comprise one or more amplifiers and/or attenuators.

In some embodiments, the transmitting radio frequency unit 402 may comprise the waveguide filter 448, the waveguide 450, and/or a diplexer. The waveguide filter 448 may be any filter coupled to the waveguide 450 and configured to filter the electromagnetic waves (e.g., remove noise). The waveguide 450 may provide the signal to the antenna via a diplexer. The diplexer may provide the signal to the antenna. The waveguide 450 may be any waveguide kind or type of waveguide. For example, the waveguide 450 may be hollow or dielectric. In some embodiments, the waveguide 450 comprises a rectangular to circular waveguide.

In some embodiments, the transmitting radio frequency unit 402 and one or more other transmitting radio frequency units are coherent transmitters. Reference signal module 434 may provide a reference signal in a coherent transmitting radio frequency unit 402. In some embodiments, the reference signal module 434 receives multiple signals (e.g., I and Q signals) and passes the signals through a phase lock loop comprising phase detector 438, filter module 440, and oscillator module 442. The phase detector 428 may detect the phase of the incoming signals and/or compare the phase to that of the oscillator signal of oscillator module 442. The signal may be filtered by filter module 440. The phase may be corrected until the desired phase of the reference signal is reached before providing the reference signal(s) via the splitter 444.

In various embodiments, the oscillator module 442 shares the oscillator signal with one or more other reference signal modules of other transmitting radio frequency units. The oscillator 442 may also provide an oscillator signal to the filter module 412 and/or the filter module 426 thereby making oscillator modules 414 and/or 428 unnecessary.

It will be appreciated that a "module" may comprise software, hardware, firmware, and/or circuitry. In one example one or more software programs comprising instructions capable of being executable by a processor may perform one or more of the functions of the modules described herein. In another example, circuitry may perform the same or similar functions. Alternative embodiments may comprise more, less, or functionally equivalent modules and still be within the scope of present embodiments. For example, as previously discussed, the functions of the various modules may be combined or divided differently.

Although FIG. 4 depicts one transmitting radio frequency unit, those skilled in the art will appreciate that there may be any number of transmitting radio frequency units, antennas, diplexers, wireless communication sources and/or combiners.

Figure 5:
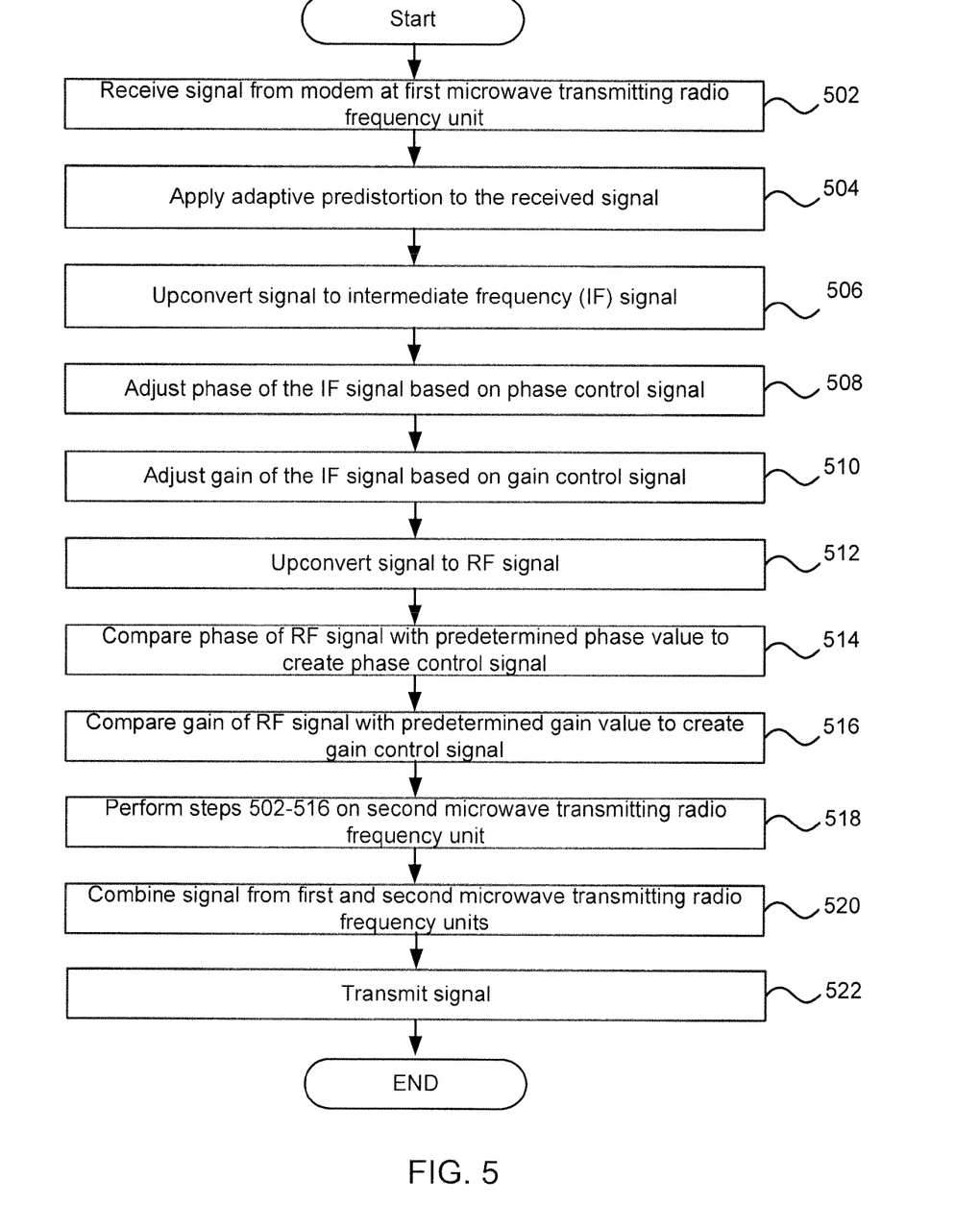
FIG. 5 is a flow chart of an exemplary method for combining signals, with similar gain and phase, from different exemplary microwave transmitting radio frequency units.

FIG. 5 is a flow chart of an exemplary method for combining signals, with similar gain and phase, from different exemplary microwave transmitting radio frequency units. In step 502, a modem 404 receives a signal and provides the I and Q signals to the predistortion module 406. In some embodiments, the modem 404 receives a single signal that is not divided into I and Q signals. Those skilled in the art will appreciate that the modem may receive any number of signals (e.g., not only I or Q signals).

In step 504, the predistortion module 406 may apply adaptive predistortion to the signals from the modem 404. The applied adaptive predistortion may be based, at least in part, the predistortion control signal provided by the adaptive module 408. The predistortion module 406 may apply the adaptive predistortion to increase linearity of the system. In various embodiments, the predistortion module 406 and the adaptive module 408 are optional (e.g., when only a single signal is received from the modem 404 and not I and Q signals).

In step 506, the first upconverter (e.g., mixer module 410, filter module 412, and oscillator module 414) upconverts the signal from the predistortion module 406 to an intermediate frequency (IF) signal. In one example, the oscillator module 414 provides an oscillator signal which is filtered by the filter module 412 and then mixed with the signal from the predistortion module 406.

In step 508, the phase adjuster 418 adjusts the phase of the IF signal. In various embodiments, the phase adjuster 418 is controlled by a phase control signal from the signal quality control module 434. The phase adjuster 418 may be a phase shifter or any other element configured to alter the phase of the signal. In some embodiments, the phase of the signal may be adjusted at any point in the circuit of transmitting radio frequency unit 402.

In step 510, the AGC module 420 adjusts the gain of the IF signal. In various embodiments, the AGC module 420 is controlled by a gain control signal (i.e., the AD signal) from the signal quality control module 434. The AGC module 420 may be any element configured to alter the gain of the signal. Those skilled in the art will appreciate that the gain of the signal may be adjusted at any point in the circuit of transmitting radio frequency unit 402.

In step 512, the second upconverter (e.g., mixer module 424, filter module 426, and oscillator module 428) upconverts the signal from the amplifier/attenuator module 422 to a radio frequency (RF) signal. The RF signal may be in the microwave frequency range. In one example, the oscillator module 428 provides an oscillator signal which is filtered by the filter module 426 and then mixed with the signal from the amplifier/attenuator module 422.

In step 514, the signal quality control module 434 compares the phase of the RF signal to a predetermined phase value and creates a phase control signal based on the comparison. The signal quality control module 434 may control the phase adjuster 418 as discussed with regard to step 508. The predetermined phase value may be based on the characteristics of one or more transmitters and/or the signal to be adjusted.

In step 516, the signal quality control module 434 compares the gain of the RF signal to a predetermined gain value and creates a gain control signal based on the comparison. The signal quality control module 434 may control the AGC module 420 as discussed with regard to step 510. The predetermined gain value may be based on the characteristics of one or more transmitters and/or the signal to be adjusted.

In step 518, a second transmitting radio frequency unit performs steps 502-516. For example, a modem of the second transmitting radio frequency unit receives a signal and provides the I and Q signals to a predistortion module. The predistortion module may apply adaptive predistortion to the signals from the modem. A first upconverter upconverts the signal from the predistortion module to an intermediate frequency (IF) signal. A phase adjuster adjusts the phase of the IF signal. An AGC module adjusts the gain of the IF signal. Subsequently, a second upconverter upconverts the signal from an amplifier/attenuator module to a radio frequency (RF) signal. A signal quality control module 434 of the second transmitting radio frequency unit compares the phase and gain of the RF signal to a predetermined phase value, respectively and creates a phase control signal and a gain control signal based on the comparisons.

In step 520, a coupler combines the signal from the first and second microwave transmitting radio frequency units. In various embodiments, a single radio enclosure houses both the first and second microwave transmitting radio frequency units. The two microwave transmitting radio frequency units may share the same antenna. Combing the signals may strengthen the signals as a result of the phase and gain being the same or substantially similar.

In various embodiments, the signal may be filtered in a waveguide filter and/or provided to the antenna via a waveguide for transmission. The waveguide filter and/or the waveguide may be a part of the radio enclosure or outside of the radio enclosure.

In step 522, the antenna may transmit the signal from both of the microwave transmitting radio frequency units.

Figure 6:
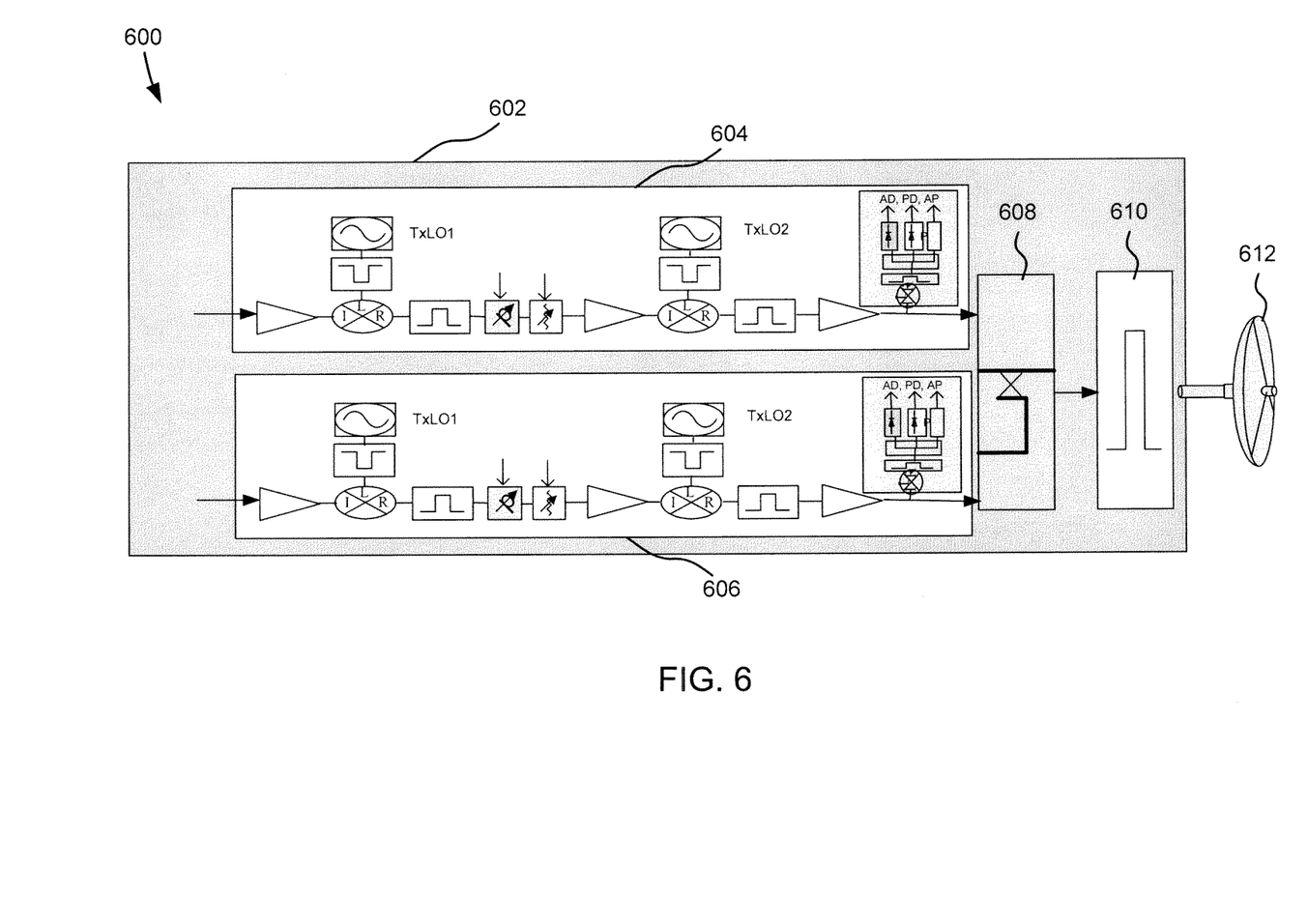
FIG. 6 depicts exemplary transmitting radio frequency units within an exemplary radio enclosure in some embodiments.
Figure 7:
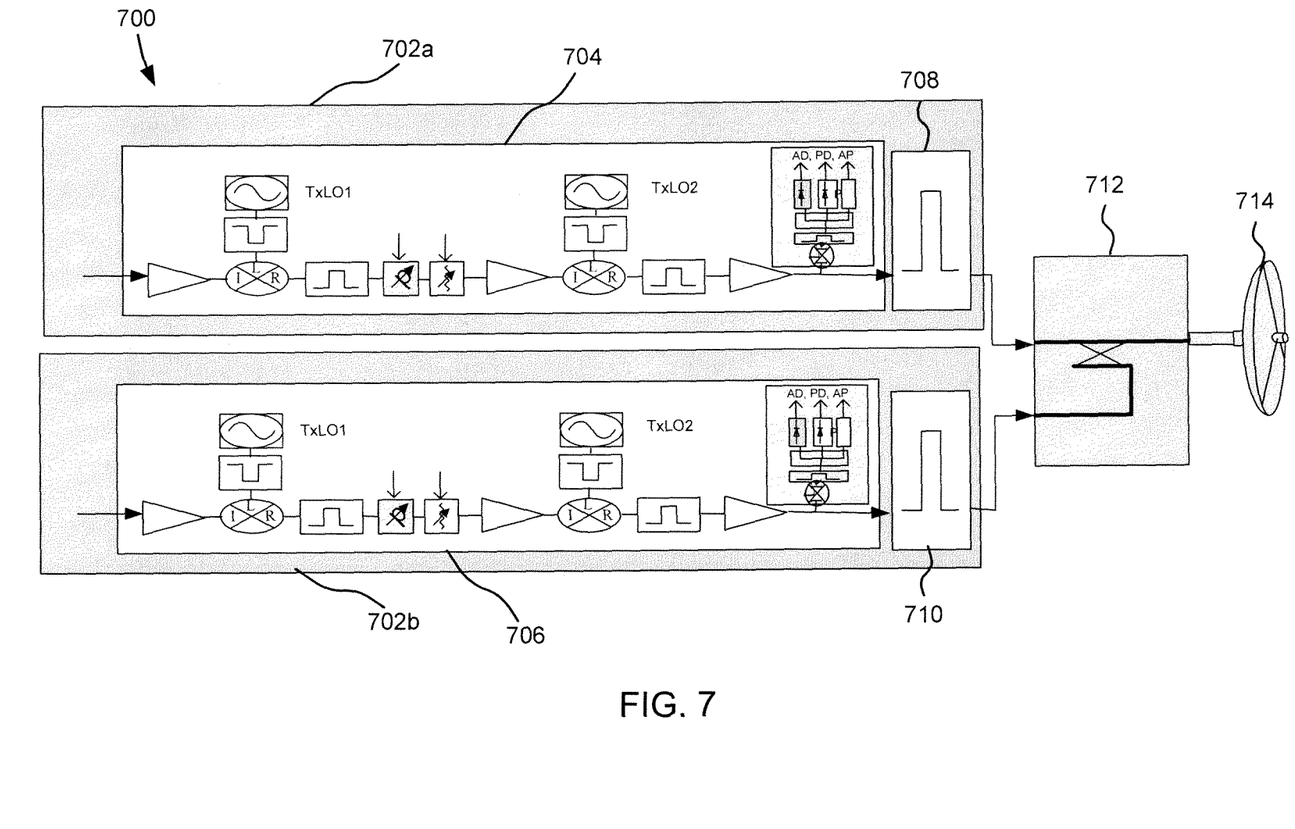
FIG. 7 depicts exemplary transmitting radio frequency units and may be within separate radio enclosures in some embodiments.

FIGS. 6 and 7 directed to multiple transmitting radio frequency units that may be within a single enclosure or outside of the single enclosure. Each transmitting radio frequency unit may filter electromagnetic wave energy with a waveguide filter, propagate the electromagnetic wave energy through a waveguide, and transmit the signal to the wireless communication receiver. These different architectures may allow hitless protection.

FIG. 6 depicts exemplary transmitting radio frequency units 604 and 606 within an exemplary radio enclosure 602 in some embodiments. The transmitting radio frequency unit 604 is coupled to the transmitting radio frequency unit 606 via the coupler 606. The signals from the transmitting radio frequency units 604 and 608 may be in substantially the same phase and gain. The signals are provided to the diplexer 610 which may provide the signal through the waveguide filter 612 to the waveguide 614 (e.g., waveguide circulator) to the antenna 616 for transmission.

The waveguide filter 612 and the waveguide 614 may be a part of the radio enclosure 602 or outside the enclosure. In various embodiments, each transmitting radio frequency unit 604 and 606 comprise a separate waveguide filter 612 and/or the waveguide 614.

The transmitting radio frequency units 604 and 606 may be coherent transmitters. In one example, the transmitting radio frequency units 604 and 606 share a reference signal module and/or share an oscillator that provides an oscillator signal that may assist to provide a reference signal. Further, the oscillator modules of the transmitting radio frequency units 604 and 606 may be shared between the two modules.

FIG. 7 depicts exemplary transmitting radio frequency units 704 and 706 may be within separate radio enclosures 702a and 702b in some embodiments. The transmitting radio frequency unit 704 is coupled to the transmitting radio frequency unit 706 via the coupler 712. The signals from the transmitting radio frequency units 704 and 706 may be in substantially the same phase and gain. The signals are provided to the diplexers 708 and 710, respectively, which may provide the signal through a waveguide filter and a waveguide to the antenna 714 for transmission.

As discussed with regard to FIG. 6, the waveguide filter and the waveguide may be a part of one or both radio enclosures. Alternately the waveguide filter and the waveguide may be outside the filter. In some embodiments, each of the transmitting radio frequency units 704 and 706 are associated with a separate waveguide filter and/or waveguide outside the radio enclosures. In yet other embodiments, a first waveguide filter and/or first waveguide may be within one radio enclosure and while a second waveguide filter and/or second waveguide may be outside a radio enclosure.

The transmitting radio frequency units 704 and 706 may be coherent transmitters. In one example, the transmitting radio frequency units 704 and 706 share a reference signal module and/or share an oscillator that provides an oscillator signal that may assist to provide a reference signal. Further, the oscillator modules of the transmitting radio frequency units 704 and 706 may be shared between the two modules. In some embodiments, the transmitting radio frequency units 704 and 706 may not be coherent.

Figure 8:
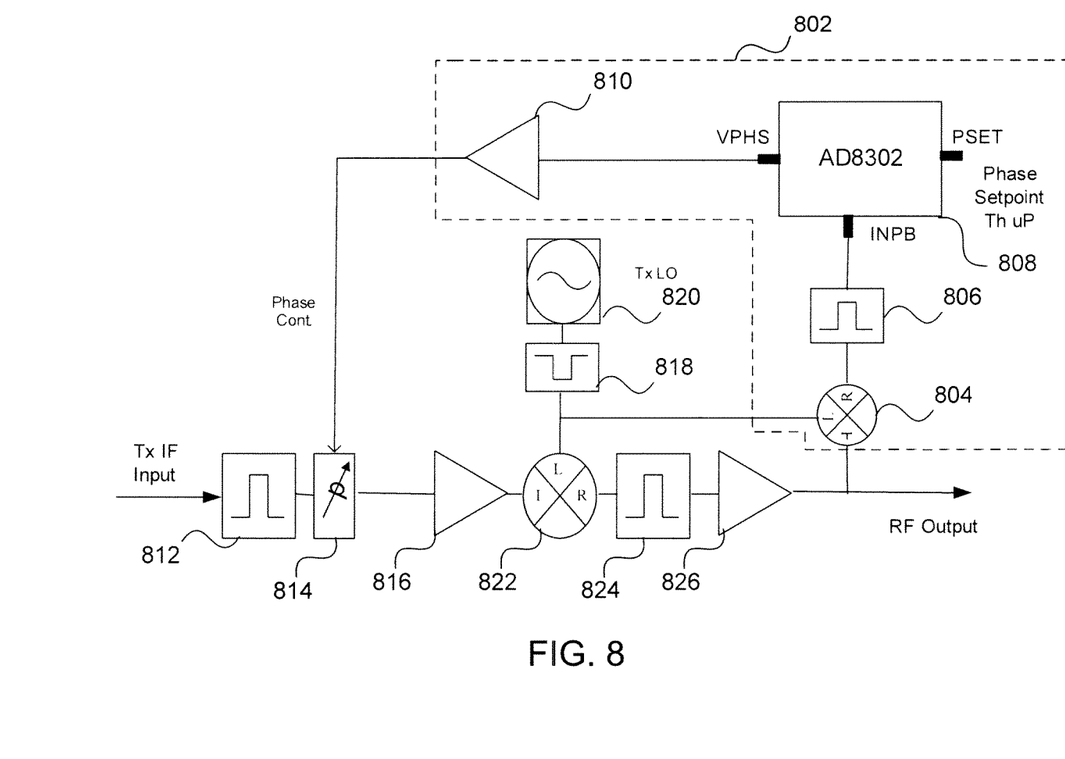
FIG. 8 is a block diagram of a signal quality control module in some embodiments.

FIG. 8 is a block diagram of a signal quality control module 802 in some embodiments. The signal quality control module 802 may comprise a mixer module 804, a filter module 806, a phase comparator 808, and an amplifier/attenuator module 810. The signal quality control module 802 may be within a transmitting radio frequency unit which also comprises a filter module 812, a phase adjuster 814, an amplifier/attenuator module 816, an upconverter (e.g., comprising a mixer module 822, a filter module 818, and an oscillator module 820), a filter module 824, and an amplifier/attenuator module 826.

In various embodiments, the mixer module 804 of the signal quality control module 802 mixes a signal from the amplifier/attenuator module 816 with a signal from the upconverter module. In one example, the signal (i.e., TX IF input signal) is filtered with the filter module 812, phase shifted by the phase adjuster 814, amplified with the amplifier/attenuator module 816, and upconverted (e.g., by mixing the signal from the amplifier/attenuator module 816 with the filtered oscillator signal from the oscillator module 820 and the filter module 818). The upconverted signal may be an intermediate frequency signal. The mixer module 804 of the signal quality control module 802 may receive the filtered oscillator signal from the upconverter module as well as the signal from the amplifier/attenuator module 826. Those skilled in the art will appreciate that the mixer module 804 may mix any two signals from any two or more points in the transmitting radio frequency unit. In some embodiments, the mixer module 804 is optional and the phase comparator 808 may compare the phase of any signal from any point within the transmitting radio frequency unit.

The filter module 806 filters the mixed signal from the mixer module 804 and provides the signal to the phase comparator 808. The phase comparator 808 may be a chip, a processor, or a module configured to compare the phase of the signal from the filter module 806 to a predetermined phase value. In one example, the phase comparator 808 may be an RF/IF detector. The phase comparator 808 generates a phase control signal based on the comparison and the amplifier/attenuator module 810 amplifies or attenuates the phase control signal before providing the phase control signal to the phase adjuster 814.

Based on the phase control signal, the phase adjuster 814 may adjust the filtered signal from the filter module 812. In some embodiments, the filter module 812 is optional.

Figure 9:
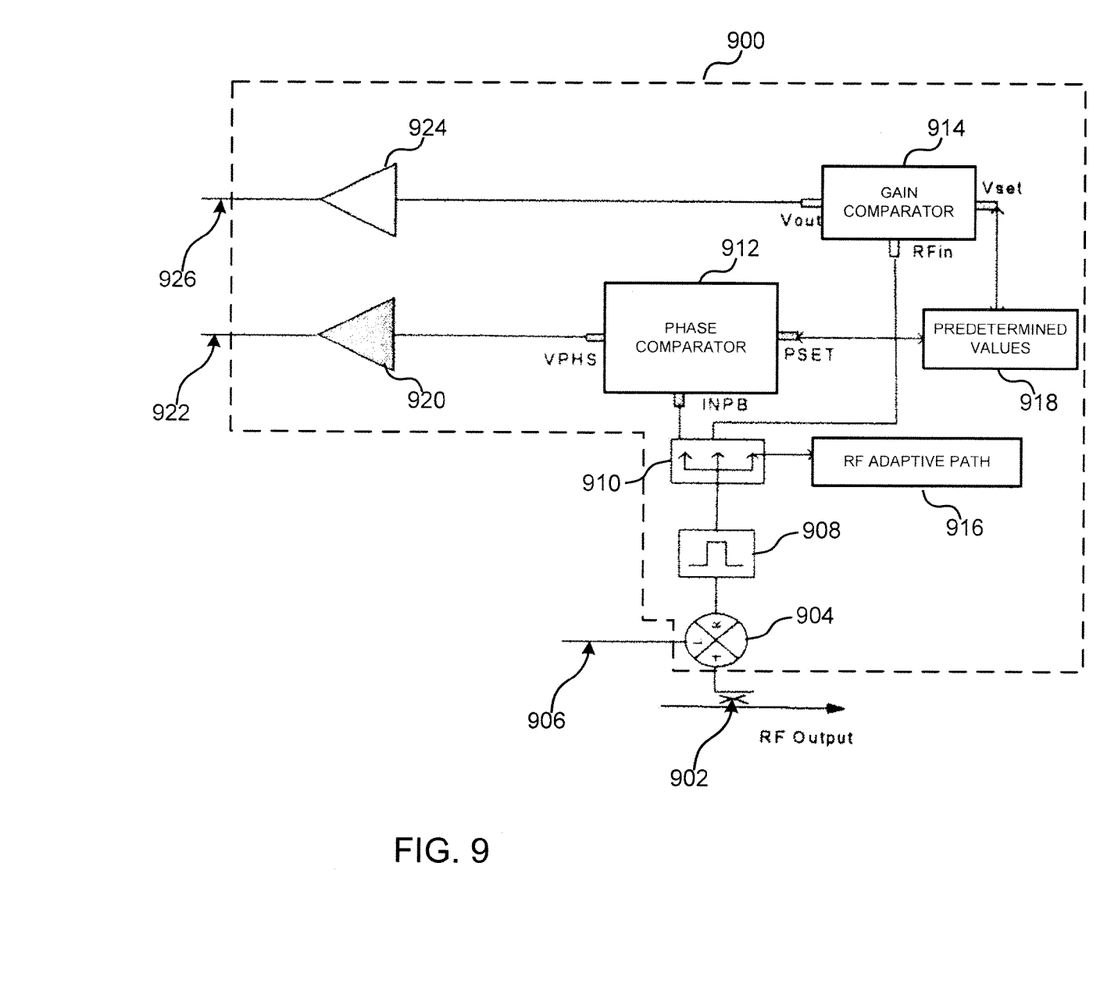
FIG. 9 is another block diagram of a signal quality control module for controlling both phase and gain of the signal in some embodiments.

FIG. 9 is another block diagram of a signal quality control module 900 for controlling both phase and gain of the signal in some embodiments. Those skilled in the art will appreciate that the gain of the signal may be adjusted in a manner similar to the phase. For example, the gain of the signal may be compared to a predetermined gain value to generate a gain control signal. An AGC may be controlled with the gain control signal to increase or decrease the gain of the signal.

Different transmitting radio frequency units may use different signal quality control modules. In some embodiments, only the phase is adjusted in this manner. In that instance, the transmitting radio frequency unit may comprise the signal quality control module of FIG. 8. In various embodiments, both the phase and the gain are adjusted in this manner. In that instance, the transmitting radio frequency unit may comprise the signal quality control module of FIG. 9. In still other embodiments, the transmitting radio frequency unit may only adjust gain in this manner. In that instance, the transmitting radio frequency unit may include the gain comparator but not the phase comparator.

The signal quality control module 900 may comprise a mixer module 904, a filter module 908, a splitter 910, a phase comparator 912 a gain comparator 914, an RF adaptive path 916, amplifier/attenuator module 920, and amplifier/attenuator module 924.

The mixer module 904 of the signal quality control module 900 may receive an oscillator signal via path 906 and an RF signal via path 902. The oscillator signal may be provided by an oscillator in the first and/or second upconverters. The RF signal may be received by a coupler. The filter module 908 filters the mixed signal from the mixer module 904 and provides the signal to the splitter 910. The splitter may split and provide the signal to the phase comparator 912, the gain comparator 914, and the RF adaptive path 916. In some embodiments, the filter module 908 is optional.

Those skilled in the art will appreciate that a legacy transmitting radio frequency unit may comprise the mixer module 904, filter module 908, and RF adaptive path 916 for providing the necessary signal to the adaptive module 408. As a result, adding the splitter 910 and/or the phase comparator 912 and the gain comparator 914 to preexisting equipment may allow for the leveraging power from multiple transmitters but with less expense.

The phase comparator 912 may be a chip, a processor, or a module configured to compare the phase of the signal from the splitter 910 with the predetermined phase value from the predetermined values module 918. In one example, the phase comparator 912 may be an RF/IF detector. The phase comparator 912 generates a phase control signal based on the comparison and the amplifier/attenuator module 920 amplifies or attenuates the phase control signal before providing the phase control signal to the phase adjuster.

Like the phase comparator 912, the gain comparator 914 may be a chip, a processor, or a module configured to compare the gain of the signal from the splitter 910 with the predetermined gain value from the predetermined values module 918. In one example, the gain comparator 914 generates a gain control signal based on the comparison and the amplifier/attenuator module 924 amplifies or attenuates the phase control signal before providing the gain control signal to an AGC. The phase control signal and the gain control signal may be provided over paths 922 and 926, respectively.

The RF adaptive path 916 may receive the signal from the splitter 910 and provide the adaptive signal to the adaptive module 408. The predetermined values module 918 may be any storage (e.g., computer readable media) that stores the predetermined phase value and the predetermined gain value.

The predetermined phase value and/or the predetermined gain value may be set within the predetermined values module in any number of ways. In various embodiments, a user may set the predetermined phase value and/or the predetermined gain value within a chip. In some embodiments, a pilot signal is sent to one or more transmitting radio frequency units. The phase comparator 808 may set the predetermined phase value and/or the predetermined gain value based on the pilot signal.

In various embodiments, one transmitting radio frequency unit may receive the predetermined phase value and/or the predetermined gain value from another transmitting radio frequency unit. For example, a first transmitting radio frequency unit may request the predetermined phase value and/or the predetermined gain value from a digital device and/or another transmitting radio frequency unit. The digital device or transmitting radio frequency unit may provide the predetermined phase value and/or the predetermined gain value to the requesting transmitting radio frequency unit. In some embodiments, a transmitting radio frequency unit provides the predetermined phase value and/or the predetermined gain value to one or more other predetermined phase value (e.g., when the transmitting radio frequency unit changes, at predetermined intervals, or upon request by a user).

The gain and/or the phase of a signal may be adjusted at any point within the transmitting radio frequency unit. Further, the gain and/or the phase of the signal may be adjusted any number of times. In one example, the phase of the signal is adjusted multiple times based on the same phase control signal. In another example, the phase of the signal is compared multiple times to one or more predetermined phase values and adjusted based on the comparison.

Figure 10:
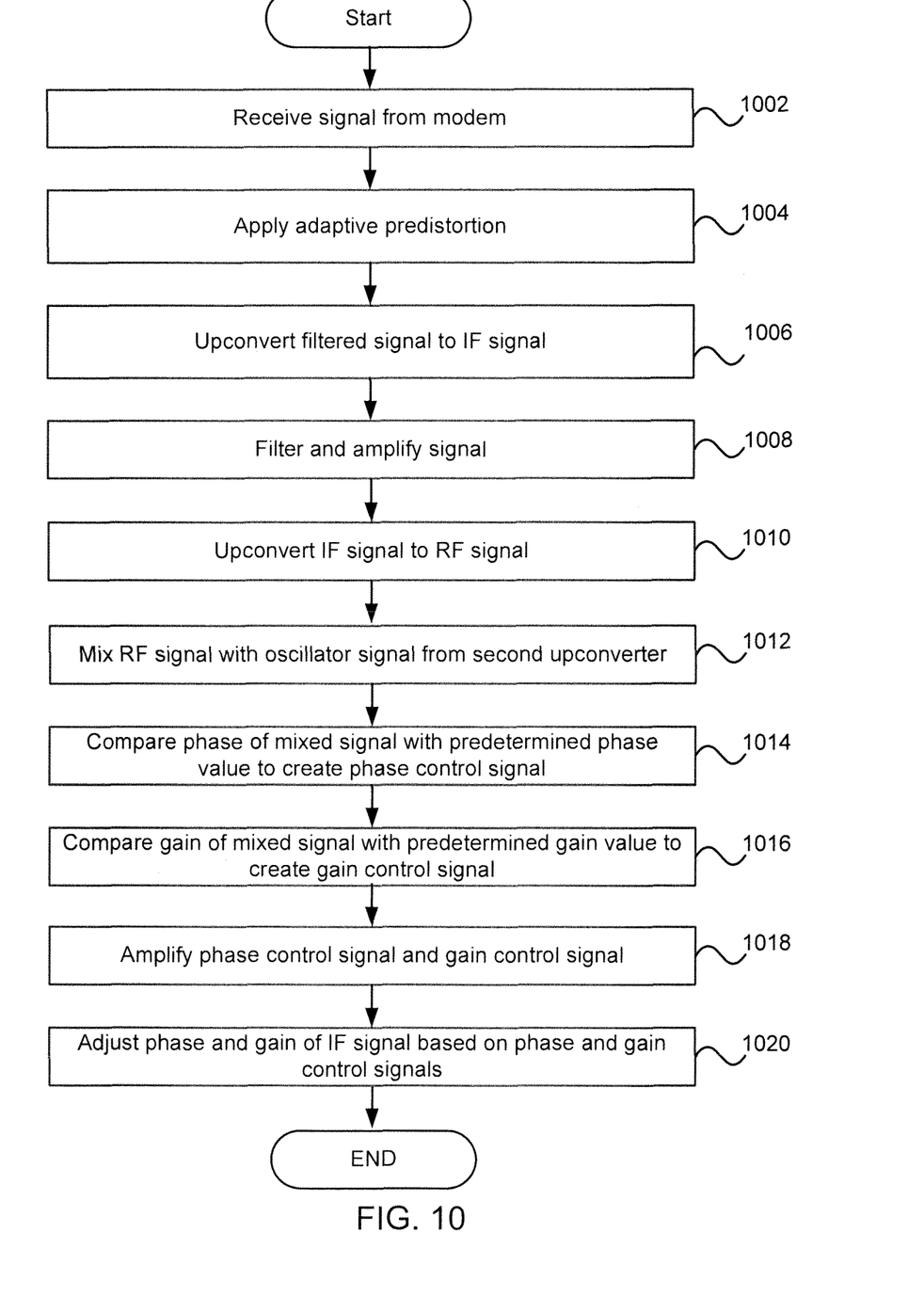
FIG. 10 is a flow chart of an exemplary method for controlling a phase and a gain of a signal in an exemplary microwave transmitting radio frequency unit.

FIG. 10 is a flow chart of an exemplary method for controlling a phase and a gain of a signal in an exemplary microwave transmitting radio frequency unit 402. In step 1002, a modem 404 provides a signal and in optional step 1004, the predistortion module applies adaptive predistortion to the signal. In step 1006, the signal is upconverted to an IF signal.

In step 1008, the IF signal is filtered by filter module 416. The signal may be further amplified or attenuated by amplifier/attenuator module 422. In step 1010, the second upconverter may upconvert the signal to an RF signal. In various embodiments, there may be any number of upconverters within the transmitting radio frequency unit 402

In step 1012, the mixer 424 mixes the RF signal with the filtered oscillator signal of the second converter. The signal may be filtered and split to provide a signal to a phase comparator, a gain comparator, and an optional adaptive predistortion control module. In various embodiments, the mixer 424 may mix the signal (e.g., RF signal, IF signal, the signal from the modem, or any signal of any frequency) with the oscillator signal from the first upconverter, the oscillator signal from the second upconverter, or an oscillator from the reference signal module 434

In step 1014, the phase comparator compares the phase of the mixed signal with the predetermined phase value to create a phase control signal. In step 1016, the gain comparator compares the phase of the mixed signal with the predetermined gain value to create a gain control signal. The phase control signal and the gain control signal may be amplified or attenuated in step 1018.

In step 1020, the phase adjuster 418 adjusts the phase of the signal (e.g., IF signal), and the AGC 420 adjusts the gain of the signal based on the phase control signal and the gain control signal, respectively.

The phase and gain adjusted RF signal may be combined with other phase and gain adjusted RF signals from other transmitting radio frequency units prior to transmitting the combined signal over an antenna.

The above-described functions and components can be comprised of instructions that are stored on a storage medium such as a computer readable medium. The instructions can be retrieved and executed by a processor. Some examples of instructions are software, program code, and firmware. Some examples of storage medium are memory devices, tape, disks, integrated circuits, and servers. The instructions are operational when executed by the processor to direct the processor to operate in accord with some embodiments. Those skilled in the art are familiar with instructions, processor(s), and storage medium.

Various embodiments are described herein as examples. It will be apparent to those skilled in the art that various modifications may be made and other embodiments can be used without departing from the broader scope of the present invention. Therefore, these and other variations upon the exemplary embodiments are intended to be covered by the present invention(s).

What is claimed is:

1. A system, comprising:
a radio enclosure;
a first transmitting radio frequency unit within the radio enclosure, the first transmitting radio frequency unit configured to receive a first intermediate signal based on a signal to be transmitted, upconvert the first intermediate signal to a first upconverted signal, generate a first comparison by comparing a phase of the first upconverted signal to a predetermined phase value, and adjust a phase of the first intermediate signal based on the first comparison to provide a first phase-adjusted upconverted signal;
a second transmitting radio frequency unit within the radio enclosure, the second transmitting radio frequency unit configured to receive a second intermediate signal based on the signal to be transmitted, upconvert the second intermediate signal to a second upconverted signal, generate a second comparison by comparing a phase of the second upconverted signal to the predetermined phase value, and adjust a phase of the second intermediate signal based on the second comparison to provide a second phase-adjusted upconverted signal; and
a coupler configured to combine the first and second phase-adjusted upconverted signals to create an output signal and provide the output signal to an antenna for transmission.

2. The system of claim 1, wherein a phase of the first phase-adjusted upconverted signal is substantially similar to a phase of the second phase-adjusted upconverted signal.

3. The system of claim 1, wherein the first transmitting radio frequency unit is further configured to compare a gain of the first upconverted signal to a predetermined gain value and adjust a gain of the first intermediate signal.

4. The system of claim 3, wherein the second transmitting radio frequency unit is further configured to compare a gain of the second upconverted signal to the predetermined gain value and adjust a gain of the second intermediate signal.

5. The system of claim 4, wherein a gain of the first phase-adjusted upconverted signal is substantially similar to a gain of the second phase-adjusted upconverted signal.

6. The system of claim 1, wherein if the first transmitting radio frequency unit fails, the second transmitting radio frequency unit performs hitless protection by providing the second phase-adjusted upconverted signal to the antenna for transmission.

7. The system of claim 1, wherein the first transmitting radio frequency unit further comprises a modem configured to provide the first intermediate signal based on an in-phase component of a baseband signal and a quadrature component of the baseband signal.

8. The system of claim 7, wherein the first transmitting radio frequency unit configured to adjust the phase of the first intermediate signal comprises the first transmitting radio frequency unit configured to adjust a phase of the in-phase component and adjust a phase of the quadrature component.

9. The system of claim 1, wherein the first and second transmitting radio frequency units are coherent.

10. The system of claim 1, wherein the coupler provides the output signal to the antenna via a waveguide filter and a waveguide for point-to-point microwave transmission.

11. A method, comprising:
  receiving, by a first transmitting radio frequency unit within a radio enclosure, a first intermediate signal based on a signal to be transmitted;
  upconverting, by the first transmitting radio frequency unit, the first intermediate signal to a first upconverted signal;
  generating, by the first transmitting radio frequency unit, a first comparison by comparing a phase of the first upconverted signal to a predetermined phase value;
  adjusting, by the first transmitting radio frequency unit, a phase of the first intermediate signal based on the first comparison to provide a first phase-adjusted upconverted signal;
  receiving, by a second transmitting radio frequency unit within the radio enclosure, a second intermediate signal based on the signal to be transmitted;
  upconverting, by the second transmitting radio frequency unit, the second intermediate signal to a second upconverted signal;
  generating, by the second transmitting radio frequency unit, a second comparison by comparing a phase of the second upconverted signal to the predetermined phase value;
  adjusting, by the second transmitting radio frequency unit, a phase of the second intermediate signal based on the second comparison to provide a second phase-adjusted upconverted signal;
  combining the first and second phase-adjusted upconverted signals to create an output signal; and
  providing the output signal to an antenna for transmission.

12. The method of claim 11, wherein a phase of the first phase-adjusted upconverted signal is substantially similar to a phase of the second phase-adjusted upconverted signal.

13. The method of claim 11, further comprising comparing, by the first transmitting radio frequency unit, a gain of the first upconverted signal to a predetermined gain value and adjusting, by the first transmitting radio frequency unit, a gain of the first intermediate signal.

14. The method of claim 13, further comprising comparing, by the second transmitting radio frequency unit, a gain of the second upconverted signal to the predetermined gain value and adjusting, by the second transmitting radio frequency unit, a gain of the second intermediate signal.

15. The method of claim 14, wherein a gain of the first phase-adjusted upconverted signal is substantially similar to a gain of the second phase-adjusted upconverted signal.

16. The method of claim 11, further comprising performing, by the second transmitting radio frequency unit, hitless protection by providing the second phase-adjusted upconverted signal to the antenna for transmission if the first transmitting radio frequency unit fails.

17. The method of claim 11, wherein receiving, by the first transmitting radio frequency unit, the first intermediate signal comprises receiving a first in-phase signal and a first quadrature signal.

18. The method of claim 17, wherein adjusting, by the first transmitting radio frequency unit, the phase of the first intermediate signal comprises adjusting, by the first transmitting radio frequency unit, a phase of the first in-phase signal and a phase of the first quadrature signal.

19. The method of claim 11, wherein the first and second transmitting radio frequency units are coherent.

20. The method of claim 11, further comprising filtering the output signal with a waveguide filter and propagating electromagnetic waves of the output signal with a waveguide.

21. A method comprising:
  providing a radio enclosure;
  installing, within the radio enclosure, a first transmitting radio frequency unit, the first transmitting radio frequency unit configured to receive a first intermediate signal based on a signal to be transmitted, upconvert the first intermediate signal to a first upconverted signal, generate a first comparison by comparing a phase of the first upconverted signal to a predetermined phase value, and adjust a phase of the first intermediate signal based on the first comparison to provide a first phase-adjusted upconverted signal;
  installing, within the radio enclosure, a second transmitting radio frequency unit, the second transmitting radio frequency unit configured to receive a second intermediate signal based on the signal to be transmitted, upconvert the second intermediate signal to a second upconverted signal, generate a second comparison by comparing a phase of the second upconverted signal to the predetermined phase value, and adjust a phase of the second intermediate signal based on the second comparison to provide a second phase-adjusted upconverted signal;
  providing a coupler configured to combine the first and second phase-adjusted upconverted signals to create an output signal;
  filtering the output signal with a waveguide filter; and
  providing the filtered output signal to an antenna for transmission.

* * * * *